US011100921B2

(12) United States Patent
Li

(10) Patent No.: US 11,100,921 B2
(45) Date of Patent: Aug. 24, 2021

(54) PINYIN-BASED METHOD AND APPARATUS FOR SEMANTIC RECOGNITION, AND SYSTEM FOR HUMAN-MACHINE DIALOG

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 177 days.

(21) Appl. No.: 16/464,381

(22) PCT Filed: Nov. 27, 2018

(86) PCT No.: PCT/CN2018/117626
§ 371 (c)(1),
(2) Date: May 28, 2019

(87) PCT Pub. No.: WO2019/200923
PCT Pub. Date: Oct. 24, 2019

(65) Prior Publication Data
US 2020/0335096 A1    Oct. 22, 2020

(30) Foreign Application Priority Data

Apr. 19, 2018  (CN) .......................... 201810354766.8

(51) Int. Cl.
*G10L 15/22* (2006.01)
*G10L 15/18* (2013.01)
(Continued)

(52) U.S. Cl.
CPC ............ *G10L 15/1815* (2013.01); *G06N 3/04* (2013.01); *G06N 3/08* (2013.01); *G10L 15/04* (2013.01); *G10L 15/16* (2013.01); *G10L 15/22* (2013.01)

(58) Field of Classification Search
CPC ...... G10L 15/1815; G10L 15/04; G10L 15/16; G10L 15/22; G10L 15/063; G10L 15/01;
(Continued)

(56) References Cited

U.S. PATENT DOCUMENTS 8,095,364 B2 * 1/2012 Longe ................... G10L 15/32
704/257
8,630,847 B2 * 1/2014 Tang ................... G06F 40/232
704/10
(Continued)

FOREIGN PATENT DOCUMENTS

CN    103678675 A    3/2014
CN    105244029 A    1/2016
(Continued)

OTHER PUBLICATIONS

PCT International Search Report, Application No. PCT/CN2018/117626, dated Mar. 4, 2019, 5 pages: with English translation.
(Continued)

*Primary Examiner* — Vijay B Chawan
(74) *Attorney, Agent, or Firm* — Armstrong Teasdale LLP

(57) ABSTRACT

The present disclosure provides a method and an apparatus for semantic recognition, and a system for human-machine dialog. In the method, a Pinyin sequence of a sentence to be recognized is obtained. The Pinyin sequence includes a plurality of Pinyin segments. Then, word vectors of the plurality of Pinyin segments are obtained. Next, the word vectors of the plurality of Pinyin segments are combined into a sentence vector of the sentence to be recognized. Based on the sentence vector of the sentence to be recognized, an output vector of the sentence to be recognized is obtained by using a neural network. Based on the output vector of the sentence to be recognized, a reference sentence semantically similar to the sentence to be recognized is determined. Then, a semantic meaning of the sentence to be
(Continued)

recognized is recognized as a semantic meaning of the reference sentence.

16 Claims, 6 Drawing Sheets

(51) Int. Cl.
*G06N 3/04* (2006.01)
*G06N 3/08* (2006.01)
*G10L 15/04* (2013.01)
*G10L 15/16* (2006.01)

(58) Field of Classification Search
CPC ......... G10L 15/26; G10L 13/08; G10L 15/02; G10L 15/05; G10L 15/18; G10L 15/183; G10L 15/24; G10L 15/32; G10L 19/0018; G10L 2015/088; G10L 15/06; G10L 15/14; G10L 15/187; G10L 15/19; G10L 15/20; G10L 15/30; G10L 2015/022; G10L 2015/025; G10L 2015/0633; G06N 3/04; G06N 3/08; G06F 40/129; G06F 40/274; G06F 40/284; G06F 40/232; G06F 40/216; G06F 40/30; G06F 40/253; G06F 40/289; G06F 40/20; G06F 40/242; G06F 40/35; G06F 40/44; G06F 40/45; G06F 3/018; G06F 3/0237; G06F 3/0233; G06F 3/0481
USPC ..... 704/10, 257, 2, 231, 235, 240, 254, 258, 704/260, 270, 3, 4, 7, 8; 707/769; 715/256, 259, 262, 264
See application file for complete search history.

(56) References Cited

U.S. PATENT DOCUMENTS

| | | | | |
|---|---|---|---|---|
| 8,862,988 B2* | 10/2014 | Baker | ...................... | G10L 13/08 |
| | | | | 715/262 |
| 9,471,566 B1* | 10/2016 | Zhang | ................... | G06F 40/129 |
| 9,786,273 B2* | 10/2017 | Longe | ..................... | G10L 15/18 |
| 9,965,045 B2* | 5/2018 | Lo | .......................... | G09B 19/06 |
| 10,209,782 B2* | 2/2019 | Li | ......................... | G06F 3/0237 |
| 10,509,862 B2* | 12/2019 | Wang | .................... | G06F 40/129 |
| 10,699,696 B2* | 6/2020 | Li | .......................... | G10L 15/01 |
| 10,714,089 B2* | 7/2020 | Li | ......................... | G10L 15/183 |
| 2005/0086590 A1* | 4/2005 | Lee | ....................... | G06F 40/216 |
| | | | | 715/256 |
| 2006/0282255 A1* | 12/2006 | Lu | .......................... | G06F 40/45 |
| | | | | 704/2 |
| 2007/0118356 A1* | 5/2007 | Badino | ................. | G06F 40/284 |
| | | | | 704/10 |
| 2008/0183460 A1* | 7/2008 | Baker | ..................... | G06F 3/018 |
| | | | | 704/3 |
| 2008/0319738 A1* | 12/2008 | Liu | ....................... | G06F 40/284 |
| | | | | 704/10 |
| 2009/0210218 A1 | 8/2009 | Collobert et al. | | |
| 2013/0311182 A1* | 11/2013 | Kim | ...................... | G10L 15/187 |
| | | | | 704/240 |
| 2014/0163975 A1* | 6/2014 | Lee | ......................... | G10L 15/01 |
| | | | | 704/231 |
| 2014/0330865 A1* | 11/2014 | Xue | ....................... | G06F 16/29 |
| | | | | 707/769 |
| 2016/0239099 A1* | 8/2016 | Lo | ........................... | G06F 3/018 |
| 2017/0206004 A1* | 7/2017 | De Bruyn | ............... | G06F 3/018 |
| 2017/0277277 A1* | 9/2017 | Li | ..................... | G06F 16/24575 |
| 2017/0324858 A1* | 11/2017 | Gao | ....................... | G06Q 10/10 |
| 2017/0357633 A1* | 12/2017 | Wang | .................... | G06F 40/289 |
| 2018/0137855 A1* | 5/2018 | Lee | ....................... | G10L 15/063 |
| 2018/0254036 A1* | 9/2018 | Li | ............................ | G06F 40/20 |
| 2018/0342233 A1* | 11/2018 | Li | ........................... | G10L 15/22 |
| 2019/0043504 A1* | 2/2019 | Li | ......................... | G06F 40/216 |

FOREIGN PATENT DOCUMENTS

| | | |
|---|---|---|
| CN | 106484664 A | 3/2017 |
| CN | 106897263 A | 6/2017 |
| CN | 107491547 A | 12/2017 |
| CN | 108549637 A | 9/2018 |

OTHER PUBLICATIONS

PCT Written Opinion, Application No. PCT/CN2018/117626, dated Mar. 4, 2019, 6 pages.: with English translation of relevant part.

* cited by examiner

PINYIN-BASED METHOD AND APPARATUS FOR SEMANTIC RECOGNITION, AND SYSTEM FOR HUMAN-MACHINE DIALOG

CROSS REFERENCE TO RELATED APPLICATIONS

This patent application is a National Stage Entry of PCT/CN2018/117626 filed on Nov. 27, 2018, which claims the benefit and priority of Chinese Patent Application No. 201810354766.8 filed on Apr. 19, 2018, the disclosures of which are incorporated by reference herein in their entirety as part of the present application.

BACKGROUND

Embodiments of the present disclosure relate to the field of human-machine dialog, and more particularly, to a method and an apparatus for semantic recognition, and a system for human-machine dialog.

With the increasing amount of the smart devices for network, these devices have a variety of forms and interaction modes. Especially with the rise of speech recognition technology companies, speech recognition technologies are becoming more and more mature, and their application areas are becoming wider and wider. Speech-based human-machine interaction approach is widely used as a more popular human-machine interaction approach. In practical application process, the existing speech recognition function generally converts speech signals into text information. Next, replies are provided to users based on the converted text information. In addition, there are human-machine interactions based on text input, such as text search or online consultation, etc.

BRIEF DESCRIPTION

An aspect of the present disclosure provides a method for semantic recognition. In this method, a Pinyin sequence of a sentence to be recognized is obtained. The Pinyin sequence includes a plurality of Pinyin segments. Then, word vectors of the plurality of Pinyin segments are obtained. The word vectors of the plurality of Pinyin segments are combined into a sentence vector of the sentence to be recognized. Next, based on the sentence vector of the sentence to be recognized, an output vector of the sentence to be recognized is obtained by using a neural network. Based on the output vector of the sentence to be recognized, a reference sentence semantically similar to the sentence to be recognized is determined. A semantic meaning of the sentence to be recognized is recognized as a semantic meaning of the reference sentence.

In some embodiments of the present disclosure, the Pinyin segment is Pinyin of a word in the sentence to be recognized.

In some embodiments of the present disclosure, the Pinyin segment is a Pinyin alphabet of a word in the sentence to be recognized.

In some embodiments of the present disclosure, in the step of determining, based on the output vector of the sentence to be recognized, the reference sentence semantically similar to the sentence to be recognized, a distance between the output vector of the sentence to be recognized and an output vector of a candidate reference sentence in a set of reference sentences is calculated. The candidate reference sentence is determined as the reference sentence semantically similar to the sentence to be recognized, in response to the distance being less than a threshold.

In some embodiments of the present disclosure, the word vectors of the plurality of Pinyin segments are obtained by means of a word embedding model.

In some embodiments of the present disclosure, the method further includes training the word embedding model by using first training data. The first training data includes Pinyin sequences of a plurality of training sentences.

In some embodiments of the present disclosure, the method further includes obtaining a Pinyin sequence of each training sentence of at least one group of training sentences, wherein the training sentences of each group of training sentences are semantically similar, and for each group of training sentences: obtaining word vectors of Pinyin segments in the Pinyin sequence of each training sentence, combining the word vectors of the Pinyin segments in the Pinyin sequence of each training sentence into a sentence vector of each training sentence, and training the neural network by using the sentence vectors of the training sentences, such that the output vectors of the training sentences from the neural network are the same.

In some embodiments of the present disclosure, in the step of obtaining the Pinyin sequence of the sentence to be recognized, the Pinyin sequence of the sentence to be recognized which is inputted by a user using a Pinyin input method is obtained.

In some embodiments of the present disclosure, in the step of obtaining the Pinyin sequence of the sentence to be recognized, speech information of the sentence to be recognized which is spoken by a user is obtained. Next, a speech recognition is performed on the speech information to obtain text information corresponding to the speech information. Next, the text information is converted into the Pinyin sequence of the sentence to be recognized.

Another aspect of the present disclosure provides an apparatus for semantic recognition. The apparatus includes at least one processor and at least one memory storing a computer program. The computer program is executable by the at least one processor, whereby the apparatus is configured to obtain a Pinyin sequence of a sentence to be recognized, wherein the Pinyin sequence includes a plurality of Pinyin segments, obtain word vectors of the plurality of Pinyin segments, combine the word vectors of the plurality of Pinyin segments into a sentence vector of the sentence to be recognized, obtain, based on the sentence vector of the sentence to be recognized, an output vector of the sentence to be recognized by using a neural network, determine, based on the output vector of the sentence to be recognized, a reference sentence semantically similar to the sentence to be recognized, and recognize a semantic meaning of the sentence to be recognized as a semantic meaning of the reference sentence.

Another aspect of the present disclosure provides an apparatus for semantic recognition. The apparatus includes a Pinyin sequence obtaining module configured to obtain a Pinyin sequence of a sentence to be recognized, a word embedding module configured to obtain word vectors of the plurality of Pinyin segments, a sentence vector obtaining module configured to combine the word vectors of the plurality of Pinyin segments into a sentence vector of the sentence to be recognized, a neural network module configured to obtain, based on the sentence vector of the sentence to be recognized, an output vector of the sentence to be recognized by using a neural network, and a semantic recognition module configured to determine, based on the output vector of the sentence to be recognized, a reference sentence semantically similar to the sentence to be recognized, and recognize a semantic meaning of the sentence to be recognized as a semantic meaning of the reference sentence.

Still another aspect of the present disclosure also provides a system for human-machine dialog, which includes an obtaining apparatus configured to obtain a sentence to be recognized from a user; the apparatus for semantic recognition according to any embodiment of the present disclosure, and an output device configured to obtain, in response to determining a reference sentence semantically similar to the sentence to be recognized, a reply associated with the reference sentence, and output the reply to the user.

Still another aspect of the present disclosure also provides a computer-readable storage medium storing computer-executable instructions. The computer-executable instructions are executable by a computer, whereby the computer is configured to perform the method for semantic recognition according to any embodiment of the present disclosure.

Still another aspect of the present disclosure also provides a computer system, which includes a processor and a memory coupled to the processor. The memory stores program instructions, and the processor is configured to perform the method for semantic recognition according to any embodiment of the present disclosure by loading and executing the program instructions in the memory.

DETAILED DESCRIPTION

In order that those skilled in the art better understand the technical solution of the present disclosure, a method and an apparatus for semantic recognition and a system for human-machine dialog provided by embodiments of the present disclosure are further described in detail below with reference to the accompanying drawings and embodiments. Apparently, the described embodiments are some but not all of the embodiments of the present disclosure. All other embodiments obtained by those of ordinary skill in the art based on the described embodiments of the present disclosure without creative efforts fall within the protection scope of the present disclosure.

For human-machine interaction based on speech, in the practical application, it is difficult to guarantee accuracy of text information converted by speech recognition. Sometimes recognition results fed back are words having similar pronunciations but quite different meanings, which may result in inaccurate semantic understanding in the next step. As a front-end input of the whole dialog system, accuracy of speech recognition has a great influence on the subsequent processing. For example, the speech "zhe fu hua shi na nian hua de (Which year was this painting painted in?)" sometimes may be recognized as "zhe fu hua shi da dian hua de (This painting is used for making a phone call.)". In another example, the speech "zhe fu hua shi na (falling tone, i.e., the third tone) nian hua de (Which year was this painting painted in?)" sometimes may be recognized as "zhe fu hua shi na (entering tone, i.e., the fourth tone) nian hua de (This painting was painted in that year.)". These may result in a failure of obtaining a correct reply based on the recognized semantic meaning.

In addition, for human-machine interaction based on text input such as text search, many users using a Pinyin input method often misspell words. In this case, the inputted words have similar pronunciations but different meanings, which may also lead to failure of searching the words accurately.

At present, there are some technical solutions for post-processing of speech recognition by using a deep learning method. In these technical solutions, a misspelled word detection model is mainly employed to pair target words with commonly-used words to obtain word pairs, and to determine, one by one, whether the word pairs have the features of misspelled word pairs in the model. If the detection result indicates that the target word is a misspelled word, the misspelled word may be replaced by a commonly-used word corresponding to the misspelled word. Implementation steps of this method are cumbersome, and manual annotation is required to process the misspelled word pairs, which further increases costs.

As can be seen, a technical solution that can improve the accuracy of speech recognition and Pinyin input is needed in the art.

Figure 1:
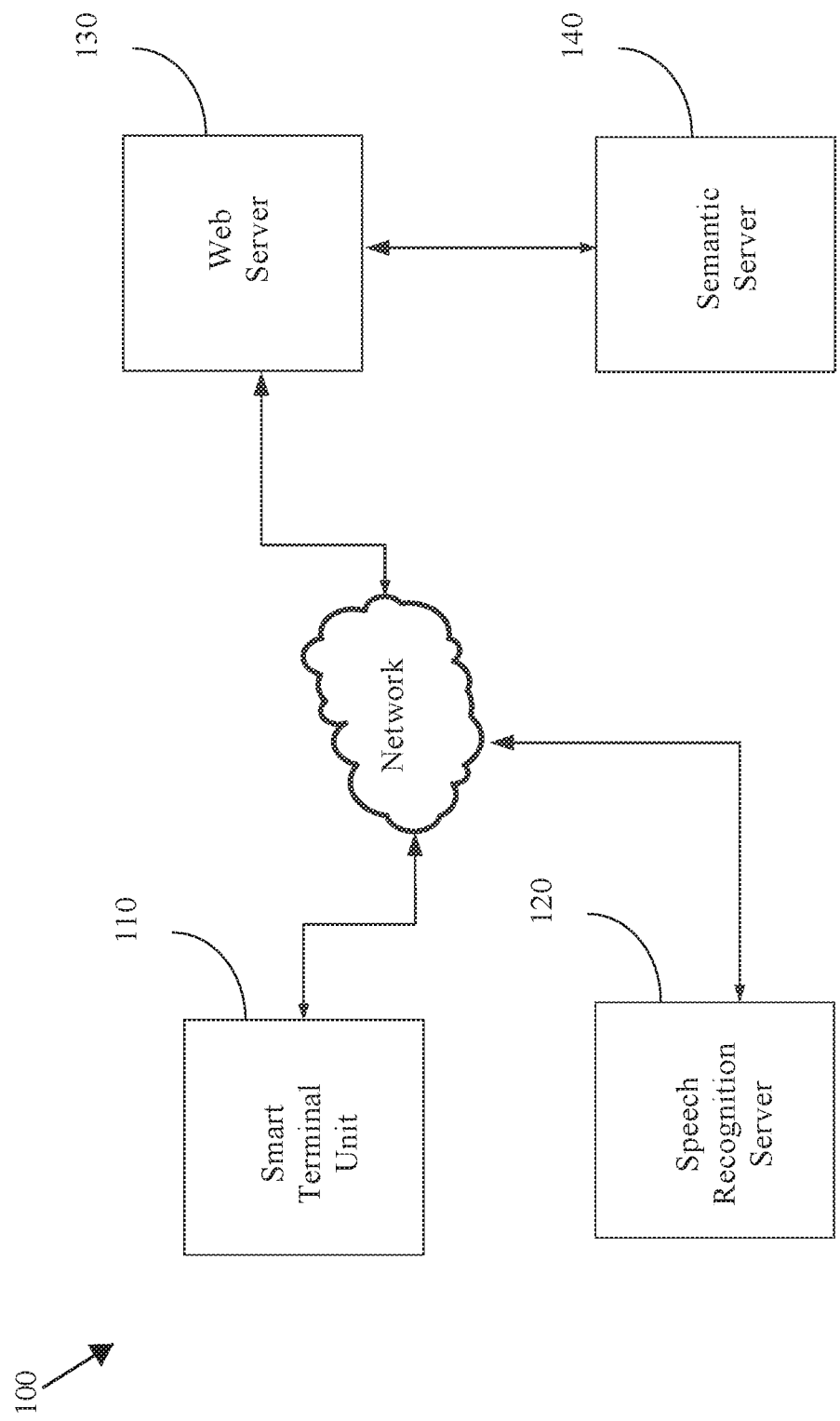
FIG. 1 illustrates a schematic structural diagram of an exemplary system for human-machine dialog in which a method and an apparatus for semantic recognition according to an embodiment of the present disclosure are able to be implemented.

Referring to FIG. 1, it illustrates a schematic structural diagram of an exemplary system 100 for human-machine dialog, in which a method and an apparatus for semantic recognition are able to be implemented according to an embodiment of the present disclosure.

As shown in FIG. 1, the system for human-machine dialog may include a smart terminal unit 110, a speech recognition server 120, a web server 130, and a semantic server 140.

The smart terminal unit 110 may be a smart terminal such as a personal computer, a smart phone, a tablet computer, or the like. The smart terminal unit 110 may have a speech capture function, and thus may capture speech information of a user. Furthermore, the smart terminal unit 110 may have a network communication function, and thus may transmit the captured speech information to the speech recognition server 120 for processing, and may transmit the information recognized by the speech recognition server 120 to the web server 130. Moreover, the smart terminal unit 110 may have a certain calculation storage function, and thus may perform storage and calculation related to the capture and transmission of the speech information and other functions.

The speech recognition server 120 may be a server computer system having a speech recognition function, which may use a third-party speech recognition service, such as a speech recognition function provided by companies such as IFLYTEK and Baidu, etc. After the smart terminal unit 110 transmits the captured speech information to the speech recognition server 120, the speech recognition server 120 performs speech recognition on the speech information to generate corresponding text information, and returns the text information to the smart terminal unit 110.

In some embodiments, the smart terminal unit 110 per se may have the speech recognition function. In this case, the system for human-machine dialog 100 may not include the separate speech recognition server 120.

The web server 130 may be a computer system having a web service function and providing a web access interface. The web server 130 receives the text information transmitted by the smart terminal unit 110 as question information, transmits the text information to the semantic server 140, and transmits the result as a reply returned by the semantic server 140 to the smart terminal unit 110.

The semantic server 140 may be a computer system having a semantic understanding function, which is configured to process the question information. A matched question is sought by matching the question information with questions stored in a database including replies to the questions. The question information is recognized through the matched question, and then the corresponding reply is returned. The semantic server 140 includes the function of providing a semantic understanding service and the function of providing model training of a model upon which the semantic understanding relies. In some other embodiments, the semantic server 140 may only include the semantic understanding service function, which uses a trained model to provide the semantic understanding service. And the training of the model may be on another separate server.

In some embodiments, the web server 130 and the semantic server 140 may be combined into a single server and may be implemented on a single computer system.

The smart terminal unit 110, the speech recognition server 120, the web server 130, and the semantic server 140 may be communicably connected to one another through a network. The network may be, for example, any one or more computer networks and/or telecommunication networks, such as the Internet, the Local Area Network, the Wide Area Network, the Intranet, or the like.

Figure 2:
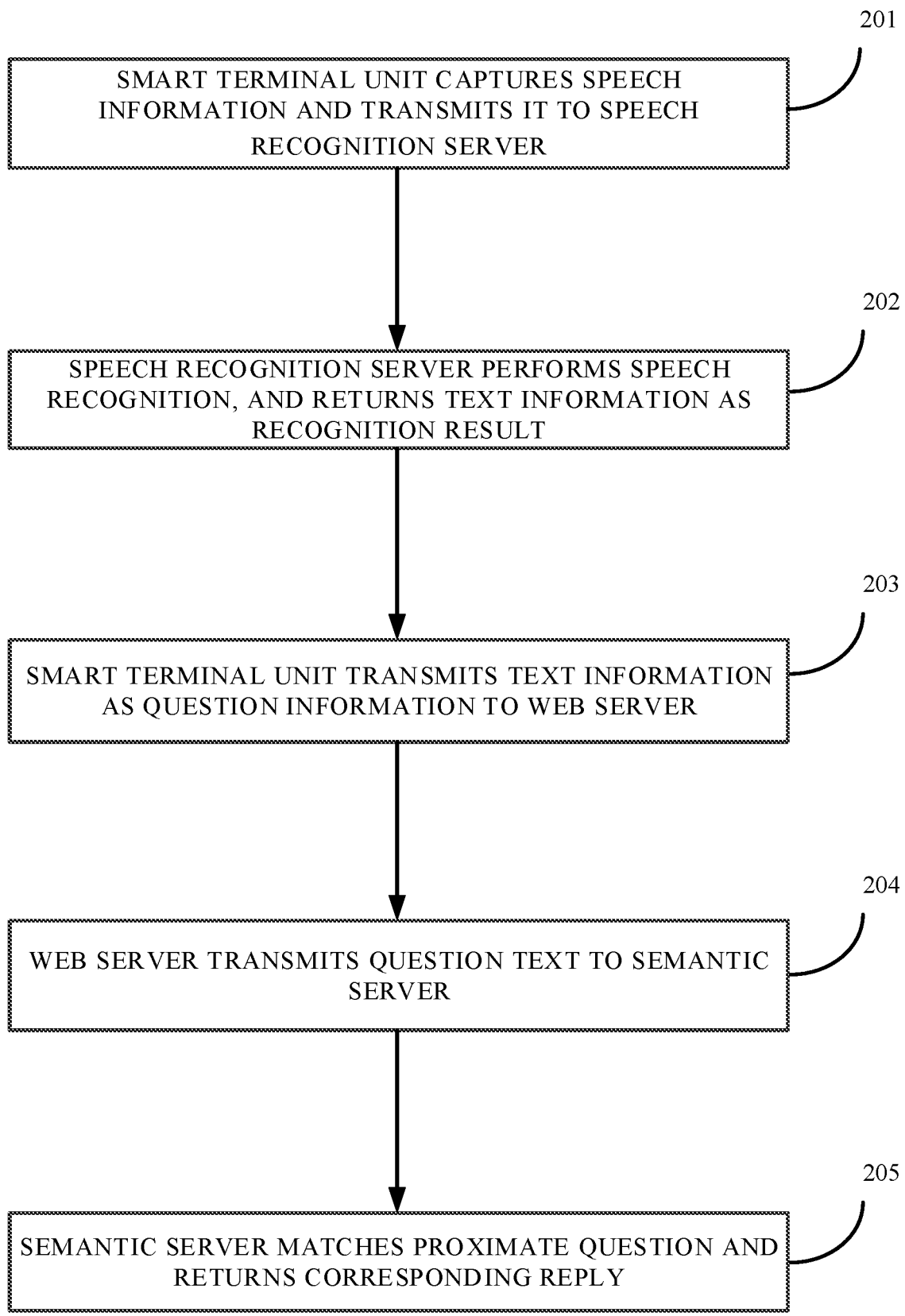
FIG. 2 illustrates a schematic dialog flowchart of the system for human-machine dialog as shown in FIG. 1.

Now referring to FIG. 2, a schematic dialog flowchart of the system for human-machine dialog as shown in FIG. 1 is illustrated. As shown in FIG. 2, the dialog flow includes the following steps.

In step 201, the smart terminal unit 110 captures speech information through a microphone or the like, and then transmits the captured speech information to the speech recognition server 120 through the network.

In step 202, the speech recognition server 120 performs a speech recognition on the speech information captured by the smart terminal unit 110, generates text information (for example, Chinese character text information or text information in other languages) as a speech recognition result, and returns the text information to the smart terminal unit 110.

In step 203, after receiving the text information as the speech recognition result, the smart terminal unit 110 transmits the text information as question information (for example, question information packaged in a specific format) to the web server 130.

In step 204, the web server 130 obtains the text information from the question information transmitted by the smart terminal unit 110, and transmits the text information as a question text to the semantic server 140.

In step 205, after receiving the question text, the semantic server 140 performs a semantic recognition by matching the question text with a question in the database including the reply to the question. After finding the best matching question, the semantic server 140 returns the corresponding reply.

In some embodiments, the method and the apparatus for semantic recognition according to the embodiments of the present disclosure are primarily implemented in the semantic server 140 of the dialog system 100.

The constitution and the dialog flow of the exemplary dialog system 100, in which the method and the apparatus for semantic recognition according to the embodiments of the present disclosure may be implemented, are described above with reference to the accompanying drawings. However, it is to be noted that the above description is by way of example only and is not intended to be limit of the system in which the present disclosure may be implemented. For example, the web server may also be implemented by other types of servers or local computer systems. Some systems may also not include the web server, but rather communicate directly with the semantic server by the smart terminal unit.

The method and the apparatus for semantic recognition according to the embodiments of the present disclosure also may be implemented in other systems other than the dialog system 100. For example, the method and the apparatus for semantic recognition according to some embodiments of the present disclosure may also be used in any occasion where the Pinyin input method is used, to perform semantic recognition on texts (e.g., Chinese texts) inputted by using the Pinyin input method. For example, when a search text is inputted into a search box of a browser using the Pinyin input method, or when a text is inputted into a character processing application using the Pinyin input method, a semantic recognition may be performed on the text outputted by the Pinyin input method using the method and the apparatus for semantic recognition according to some embodiments of the present disclosure, to recognize and/or replace misspelled words therein. In this case, the system, in which the method and the apparatus for semantic recognition according to some embodiments of the present disclosure may be applied, may not include a speech recognition server, but may include a smart terminal unit configured to receive Pinyin inputted by a user and generate corresponding text information, a web server configured to receive the text information from the smart terminal unit, and a semantic server configured to receive the text information from the web server, perform a semantic recognition on the text information and return a semantic recognition result. Correspondingly, the smart terminal unit may include an apparatus having a Pinyin input method, such as a keyboard, a touch screen and the like, such that text may be inputted using the Pinyin input method. Moreover, the smart terminal unit may not include a speech capture function.

Figure 3:
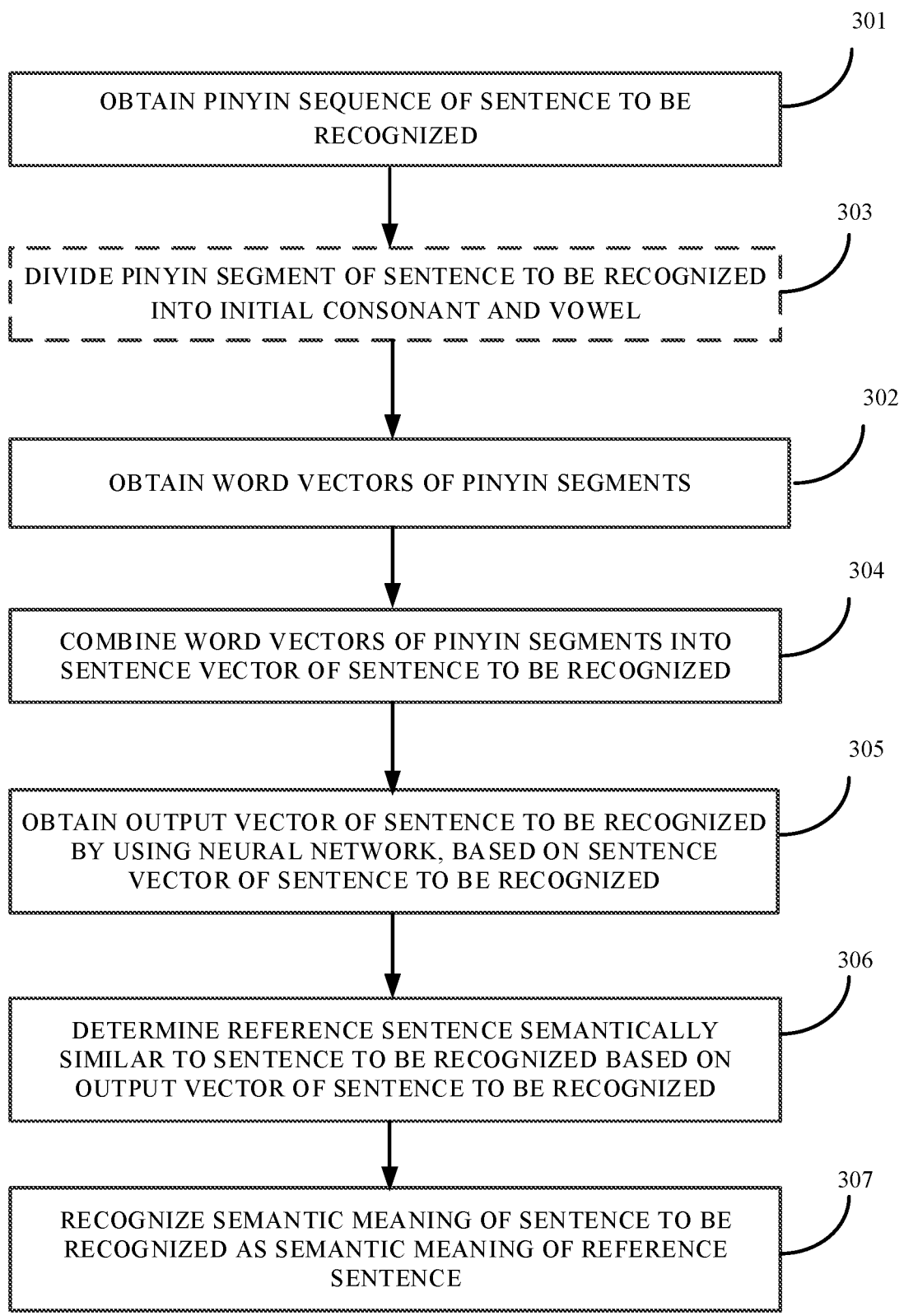
FIG. 3 illustrates a flowchart of the method for semantic recognition according to an embodiment of the present disclosure.

Now referring to FIG. 3, a flowchart of a method for semantic recognition according to an embodiment of the present disclosure is illustrated. At least a part of the method for semantic recognition may be performed, for example, in the dialog system 100 as shown in FIG. 1 and described above (e.g., mainly performed by the semantic server 140), or may be performed in other systems (e.g., systems using the Pinyin input method).

As shown in FIG. 3, the method for semantic recognition according to an embodiment of the present disclosure may include the following steps.

In step 301, a Pinyin sequence of a sentence to be recognized is obtained. The Pinyin sequence includes a plurality of Pinyin segments. The step 301 may be performed by, for example, the semantic server 140 in the dialog system 100 as shown in FIG. 1. In this case, the semantic server 140 may obtain text information converted by the user's speech from the web server 130 or the smart terminal unit 110, and may convert the text information into a corresponding Pinyin sequence. The step 301 may also be collectively performed by, for example, the semantic server 140, the smart terminal unit 110, the speech recognition server 120, and the web server 130 in the dialog system 100 as shown in FIG. 1.

The sentence to be recognized may include, for example, characters or words in Chinese sentences, or words in sentences in other languages such as English, etc.

In some exemplary embodiments, the step 301 of obtaining a Pinyin sequence of a sentence to be recognized includes the following substep: obtaining the Pinyin sequence of the sentence to be recognized which is inputted by a user using a Pinyin input method. This substep may be performed by, for example, the smart terminal unit using the Pinyin input method.

In some other exemplary embodiments, the step 301 of obtaining the Pinyin sequence of the sentence to be recognized includes the following substeps.

Substep 1: obtaining speech information of the sentence to be recognized which is spoken by a user. This substep may be performed by, for example, the smart terminal unit 110 in the dialog system 100. For example, the smart terminal unit 110 may obtain the speech information "zhe fu hua shi na nian hua de (Which year was this painting painted in?)" which is spoken by the user.

Substep 2: performing a speech recognition on the speech information to obtain text information corresponding to the speech information. This substep may be performed by, for example, the speech recognition server 120 in the dialog system 100. For example, the speech recognition server 120 may perform a speech recognition on the speech information "zhe fu hua shi na nian hua de (Which year was this painting painted in?)" to obtain the corresponding text information.

Substep 3: converting the text information into the Pinyin sequence of the sentence to be recognized. This substep may be performed by, for example, the semantic server 140 in the dialog system 100. For example, the semantic server 140 may receive the text information of the speech information "zhe fu hua shi na nian hua de?". After word division is performed on the text information, the text information is converted into the Pinyin sequence "zhe fu hua shi na nian hua de".

In step 302, word vectors of the plurality of Pinyin segments are obtained. The step 302 may be performed by, for example, the semantic server 140 in the dialog system 100 as shown in FIG. 1 or semantic servers in other systems.

In some exemplary embodiments, the plurality of Pinyin segments are Pinyin segments of each word in the sentence to be recognized. For example, the Pinyin segments of the Pinyin sequence "zhe fu hua shi na nian hua de" are "zhe", "fu", "hua", "shi", "na", "nian", "hua", and "de".

In some other exemplary embodiments, prior to the step 302, the method further includes step 303. In the step 303, the Pinyin segment of each word in the sentence to be recognized is divided into an initial consonant and a vowel as the Pinyin segment in the Pinyin sequence. For example, Pinyin "zhe", "fu", "hua", "shi", "na", "nian", "hua", and "de" of words in the Pinyin sequence "zhe fu hua shi na nian hua de" are divide into initial consonants and vowels to form the Pinyin segments "zh", "e", "f", "u", "h", "ua", "sh", "i", "n", "a", "n", "ian", "h", "ua", "d", and "e".

In some exemplary embodiments, word vectors of the plurality of Pinyin segments are obtained using a word embedding model. The word embedding model may be a trained word embedding model, whose training method may be as described hereinafter.

The word embedding model may be any word embedding model well known in the art. As is known in the art, word embedding models may be configured to map words (such as Chinese characters, Pinyin of Chinese characters, or initial consonants or vowels of Pinyin of the Chinese characters, or words in other languages such as English, in this application) from a vocabulary into vectors (referred to as word vectors) in a vector space. In some embodiments of the present disclosure, the word embedding model receives each Pinyin segment in the Pinyin sequence as an input, and outputs the word vectors of the Pinyin segments. For example, the word embedding model receives the Pinyin segments "zh", "e", "f", "u", "h", "ua", "sh", "i", "n", "a", "n", "ian", "h", "ua", "d" and "e", and outputs the word vectors of these Pinyin segments.

In an exemplary embodiment of the present disclosure, the word embedding model is a Word2vec model. As is known in the art, the Word2vec model is a group of common word embedding models. As a two-layer neural network, these models are trained to reconstruct linguistic contexts of words. The Word2vec model uses a text corpus as an input and generates a vector space that typically has hundreds of dimensionalities. Each word in the corpus is allocated to a corresponding vector (i.e., a word vector) in the vector space. The word vectors are distributed in the vector space such that word vectors of words having a common context in the corpus are located close to one another in the vector space.

In step 304, the word vectors of the plurality of Pinyin segments are combined into a sentence vector of the sentence to be recognized. Each element of the sentence vector is the word vector of each Pinyin segment in the Pinyin sequence of the sentence to be recognized. The sentence vector may be a multidimensional vector. For example, the sentence vector of the sentence "zhe fu hua shi na nian hua de" is made up of the word vectors of the Pinyin segments "zh", "e", "f", "u", "h", "ua", "sh", "i", "n", "a", "n", "ian", "h", "ua", "d", and "e". The step 304 may be performed by, for example, the semantic server 140 in the dialog system 100 as shown in FIG. 1 or semantic servers in other systems.

In step 305, an output vector of the sentence to be recognized is obtained by using a neural network, based on the sentence vector of the sentence to be recognized. The step 305 may be performed by, for example, the semantic server 140 in the dialog system 100 as shown in FIG. 1 or semantic servers in other systems. The neural network may be stored in a memory of the semantic server in the form of software for example.

The neural network may be a trained neural network, whose training method may be as described hereinafter.

The neural network may be any single neural network or a combination of a plurality of neural networks known in the art capable of analyzing and processing natural languages. For example, the neural network may be a deep learning neural network such as Convolutional Neural Networks (CNN) or a Long Short-Term Memory (LSTM), etc.

Taking the CNN as an example, as is known in the art, the CNN may typically include an input layer (A+B), several convolutional layers+activation function layers, several sub-sampling layers interleaved with the convolutional layers, and an output layer, etc. The input layer is configured to receive input data. The convolutional layer is configured to perform convolution processing on data outputted from preceding layers. The convolutional layer has a weight and a bias. The weight represents a convolution kernel, and the bias is a scalar superimposed on the output of the convolutional layer. Typically, each convolutional layer may include tens of or hundreds of convolution kernels. Each CNN may include a plurality of convolutional layers. The activation function layer is configured to perform a functional transformation on the output data from the preceding convolutional layer. The subsampling layer is configured to subsample the data from the preceding layer. The subsampling methods include but are not limited to max-pooling, avg-pooling, random pooling, decimation (for example, selecting a fixed pixel), demuxout (dividing an input image into a plurality of smaller images), and the like. The output layer may include an activation function and is configured to output the output data.

The neural network generally includes a training phase and a using phase. In the training phase, the neural network is trained by using training data (including input data and expected output data). In the training phase, the input data are inputted into the neural network to obtain the output data. Next, internal parameters of the neural network are adjusted by comparing the output data with the expected output data. In the using phase, the trained neural network may be configured to perform tasks such as image or semantic recognition, etc. That is, the input data are inputted into the trained neural network to obtain corresponding output data.

In step 306, a reference sentence semantically similar to the sentence to be recognized is determined based on the output vector of the sentence to be recognized.

In step 307, a semantic meaning of the sentence to be recognized is recognized as a semantic meaning of the reference sentence.

The step 306 and the step 307 may be performed by, for example, the semantic server 140 in the dialog system 100 as shown in FIG. 1 or semantic servers in other systems. In some exemplary embodiments, the output layer of the neural network may be directly configured to determine, based on the output vector of the sentence to be recognized, the reference sentence semantically similar to the sentence to be recognized.

When the method for semantic recognition is applied to the dialog system 100 as shown in FIG. 1, the reference sentence may be, for example, a question sentence from a database including replies to questions. The database may include a large number of question sentences which may be involved in the dialog system 100 and replies corresponding to the question sentences. The database may be stored, for example, in a memory associated with the semantic server 140 or in a memory accessible by the semantic server 140. Thus, the output vector of the sentence may be obtained by using the neural network in the step 305. In addition, a sentence vector (which may be obtained in the above step 304) of each question sentence in the database is inputted into the neural network to obtain the output vector of each question sentence. Next, by comparing the output vector of the sentence to be recognized with the output vector of each question sentence, it is determined whether the sentence to be recognized is semantically similar to a certain question sentence. If it is determined that the sentence to be recognized is semantically similar to a certain question sentence in the database, a reply corresponding to this question sentence may be obtained from the database. Next, this reply is provided to the user as a reply to the sentence to be recognized.

When the method for semantic recognition is applied to a system such as a search system using a Pinyin input method, the reference sentence may be, for example, a search sentence library from a search system. The search sentence library may include a large number of search sentences which may be involved in the search system. In this way, the output vector of the sentence to be recognized may be obtained by using the neural network in the step 305. In addition, a sentence vector (which may be obtained in the same step as described above) of each search sentence in the search sentence library is inputted into the neural network to obtain the output vector of each search sentence. Next, by comparing the output vector of the sentence to be recognized with the output vector of each search sentence, it is determined whether the sentence to be recognized is semantically similar to a certain search sentence. If it is determined that the sentence to be recognized is semantically similar to a certain search sentence, this search sentence may be presented to the user, to replace a search sentence inputted by the user that may contain misspelled word.

In some exemplary embodiments, the step 306 of recognizing whether the sentence to be recognized is semantically similar to the reference sentence by comparing the output vector of the sentence to be recognized with the output vector of the reference sentence may include following substeps.

In substep 1, a distance between the output vector of the sentence to be recognized and an output vector of a candidate reference sentence in a set of reference sentences is calculated.

In substep 2, the candidate reference sentence is determined as the reference sentence semantically similar to the sentence to be recognized, in response to the distance being less than a threshold.

Any method known in the art may be employed to calculate the distance between the output vector of the sentence to be recognized and the output vector of the candidate reference sentence, for example, cosine distance (also referred to as cosine similarity), Euclidean distance and Mahalanobis distance methods.

As mentioned above, the word embedding model used in the step 302 may be a trained word embedding model. Furthermore, the neural network used in the step 305 may be a trained neural network. Therefore, in some exemplary embodiments, the method for semantic recognition may further include implementing a training process for the word embedding model and a training process for the neural network. The training process for the word embedding model may be completed prior to the step 302 of using the word embedding model. The training process for the neural network may be completed prior to the step 305 of using the neural network. These training processes may be performed by, for example, the semantic server 140 in the dialog system 100 as shown in FIG. 1, or also may be performed by semantic servers in other systems.

Through a technical solution according to an embodiment of the present disclosure, a Pinyin sequence with a high pronunciation similarity to the Pinyin sequence of the words in the sentence to be recognized may be obtained, to eliminate interference caused by words having the same pronunciation but different meanings in the process of speech recognition or spelling. Thus, accuracy of speech understanding or Pinyin input is enhanced. In addition, preprocessing steps required for the technical solution according to some embodiments of the present disclosure is simple but efficient, and thus this technical solution is a low-cost solution.

Figure 4:
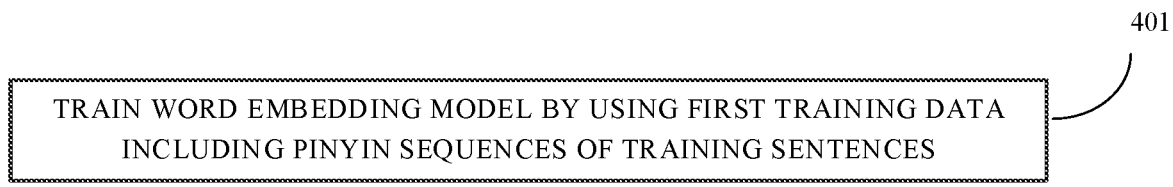
FIG. 4 illustrates a schematic training process for the word embedding model in the method for semantic recognition according to an embodiment of the present disclosure.

Referring now to FIG. 4, a schematic training process for the word embedding model in the method for semantic recognition according to an embodiment of the present disclosure is illustrated. As shown in FIG. 4, in some exemplary embodiments, the training process for the word embedding model in the method for semantic recognition may further include the following step.

In step 401, the word embedding model is trained by using first training data. The first training data include Pinyin sequences of a plurality of training sentences.

The first training data may be generated by, for example, obtaining a large number of sentences from a text corpus, converting each sentence into a Pinyin sequence, and obtaining a plurality of Pinyin segments in the Pinyin sequence of each sentence. The Pinyin segment may be, for example, Pinyin of each word (or character), or may be a Pinyin segment formed by further dividing the Pinyin of each word (or character) into an initial consonant and a vowel.

The text corpus may be, for example, a text corpus for a particular kind of dialog system. Thus, sentences in the text corpus are sentences used in this particular kind of dialog system. For example, a text corpus for a dialog system related to a technical support for a certain kind or type of product will include various sentences used in the technical support process of this kind or type of product. Alternatively, the text corpus may also be a corpus of sentences used in some other occasions. Still alternatively, the text corpus may also be a corpus of common sentences in a certain language (such as Chinese or English).

As is known to those skilled in the art, in the training process for the word embedding model, the pinyin segments in the pinyin sequence of each sentence in the first training data are inputted into the word embedding model. The word embedding model outputs the word vectors of each Pinyin segment in the Pinyin sequence of each sentence. In this process, parameters of the word embedding model are continuously adjusted, such that the word vectors of the Pinyin segments having the common context (e.g., appearing in the same sentence with a distance less than a specified distance) in the first training data are located closer in the vector space. In this way, after the training is completed, the trained word embedding model can output word vectors with a closer distance for the Pinyin segments having the common context. Thus, the word embedding model may be used in the step 302.

Figure 5:
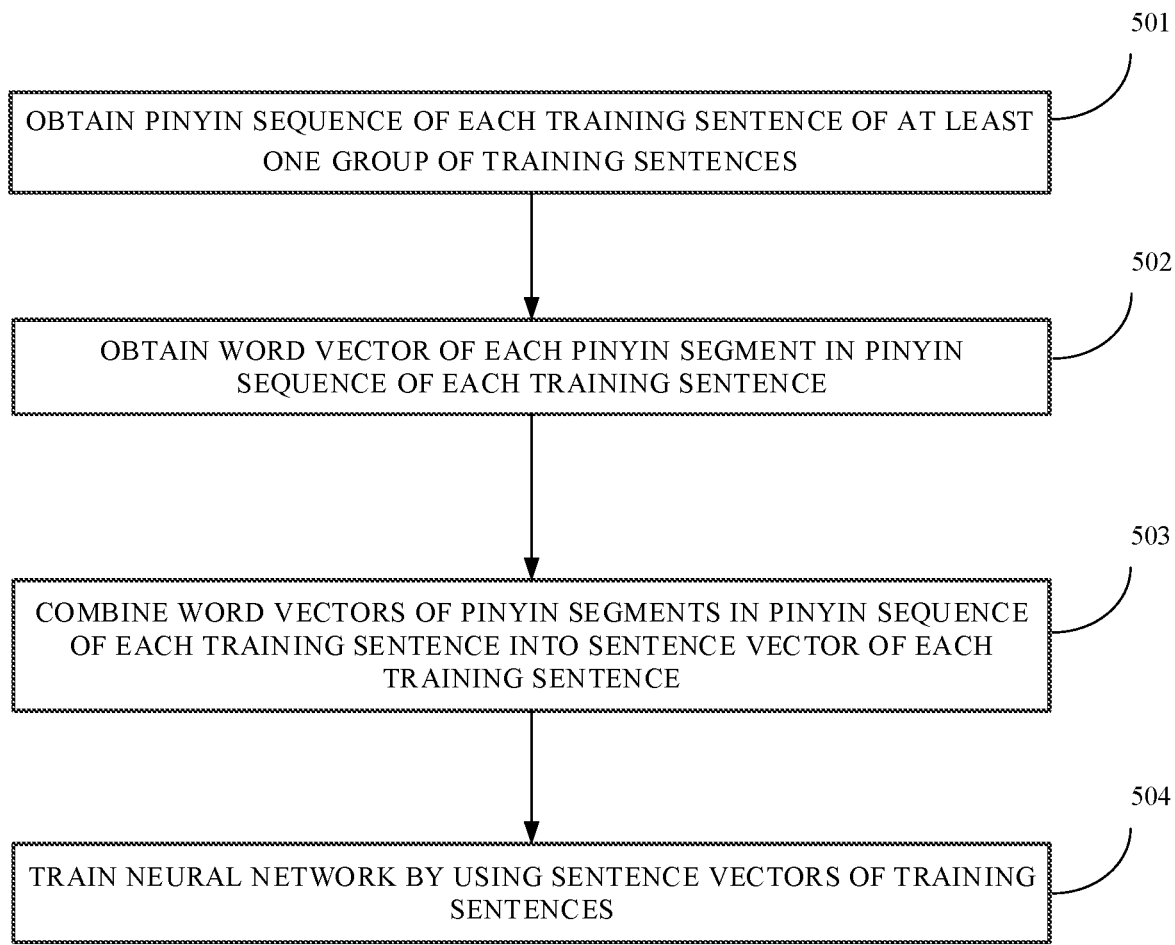
FIG. 5 illustrates a schematic training process for the neural network in the method for semantic recognition according to an embodiment of the present disclosure.

Referring now to FIG. 5, a schematic training process for the neural network in the method for semantic recognition according to an embodiment of the present disclosure is illustrated. As shown in FIG. 5, in some exemplary embodiments, the training process for the neural network in the method for semantic recognition includes the following steps.

In step 501, a Pinyin sequence of each training sentence of at least one group of training sentences is obtained.

The training sentences of each group of training sentences are semantically similar. For example, the training sentence "Who painted this painting?" and the training sentence "Who is the author of this painting?" are a group of semantically similar training sentences. The at least one group of training sentences may be from, for example, a text corpus. The text corpus may be, for example, a text corpus for a particular kind of dialog system. Thus, sentences in the text corpus are sentences used in this particular kind of dialog system. For example, a text corpus for a dialog system related to a technical support for a certain kind or type of product will include various sentences used in the technical support process of this kind or type of product. Alternatively, the text corpus may also be a corpus of sentences used in some other occasions. Still alternatively, the text corpus may also be a corpus of common sentences in a certain language (such as Chinese or English).

After the at least one group of training sentences are obtained from, for example, the text corpus, each of the training sentences may be converted into a Pinyin sequence. Next, a plurality of Pinyin segments in the Pinyin sequence of each training sentence are obtained. The Pinyin segment may be, for example, Pinyin of each word (or character), or may be a Pinyin segment formed by further dividing Pinyin of each word (or character) into an initial consonant and a vowel.

In step 502, the word vector of each Pinyin segment in the Pinyin sequence of each training sentence is obtained. The word vector of each Pinyin segment in the Pinyin sequence is obtained by using the word embedding model. The word embedding model may be, for example, the word embedding model trained in the step 401.

In step 503, the word vectors of the Pinyin segments in the Pinyin sequence of each training sentence are combined into a sentence vector of each training sentence. Each element of the sentence vector of each training sentence is the word vector of each Pinyin segment in the Pinyin sequence of each training sentence. The sentence vector may be a multidimensional vector.

In step 504, the neural network is trained by using the sentence vector of each training sentence of the at least one group of training sentences. In the training process, the sentence vector of each training sentence of each group of semantically similar training sentences is inputted into the neural network, to obtain an output result of the neural network. Next, internal parameters of the neural network are adjusted in order that the output results of the training sentences of each group of semantically similar training sentences are the same. Thus, after training a large number of training sentences, the neural network can output the same or similar results for a plurality of sentences semantically identical or similar but different in characters, thereby obtaining a semantic recognition capability.

The method for semantic recognition according to some embodiments of the present disclosure has been described above with reference to the accompanying drawings, and it is to be noted that the above description is by way of example only and is not intended to be limit of the present disclosure. In other embodiments of the present disclosure, the method may have more, less, or different steps, and the relationship such as sequences, inclusion, and functionality etc. among the steps may be different from what has been described and illustrated. For example, a plurality of functions generally completed in one step also may be executed in a plurality of separate steps. A plurality of steps executing different functions may be combined into one step for executing these functions. Some steps may be performed in any order or in parallel. All these variations fall within the spirit and the scope of the present disclosure.

Another aspect of the present disclosure further provides an apparatus for semantic recognition. Now referring to FIG. 6, a schematic structural block diagram of an apparatus 600 for semantic recognition according to an embodiment of the present disclosure is illustrated. Functions or operations performed by modules of the apparatus 600 for semantic recognition correspond to at least some steps of the method for semantic recognition according to some embodiments of the present disclosure. For the sake of brevity, some details repeated with the above descriptions are omitted in the following descriptions. Therefore, more details on the apparatus 600 for semantic recognition according to some embodiments of the present disclosure may be obtained with reference to the above descriptions. In some embodiments, the apparatus for semantic recognition is implemented by, for example, the semantic server 140 in the dialog system 100 as shown in FIG. 1, or is implemented by semantic servers in other systems. Specifically, the apparatus for semantic recognition may be implemented by, for example, a combination of semantic recognition software and general-purpose computer hardware such as a processor or memory that implements the semantic server. In the case that the memory loads the semantic recognition software to the processor and the processor executes the semantic recognition software, components in the apparatus for semantic recognition are formed and their functions or operations are executed.

Figure 6:
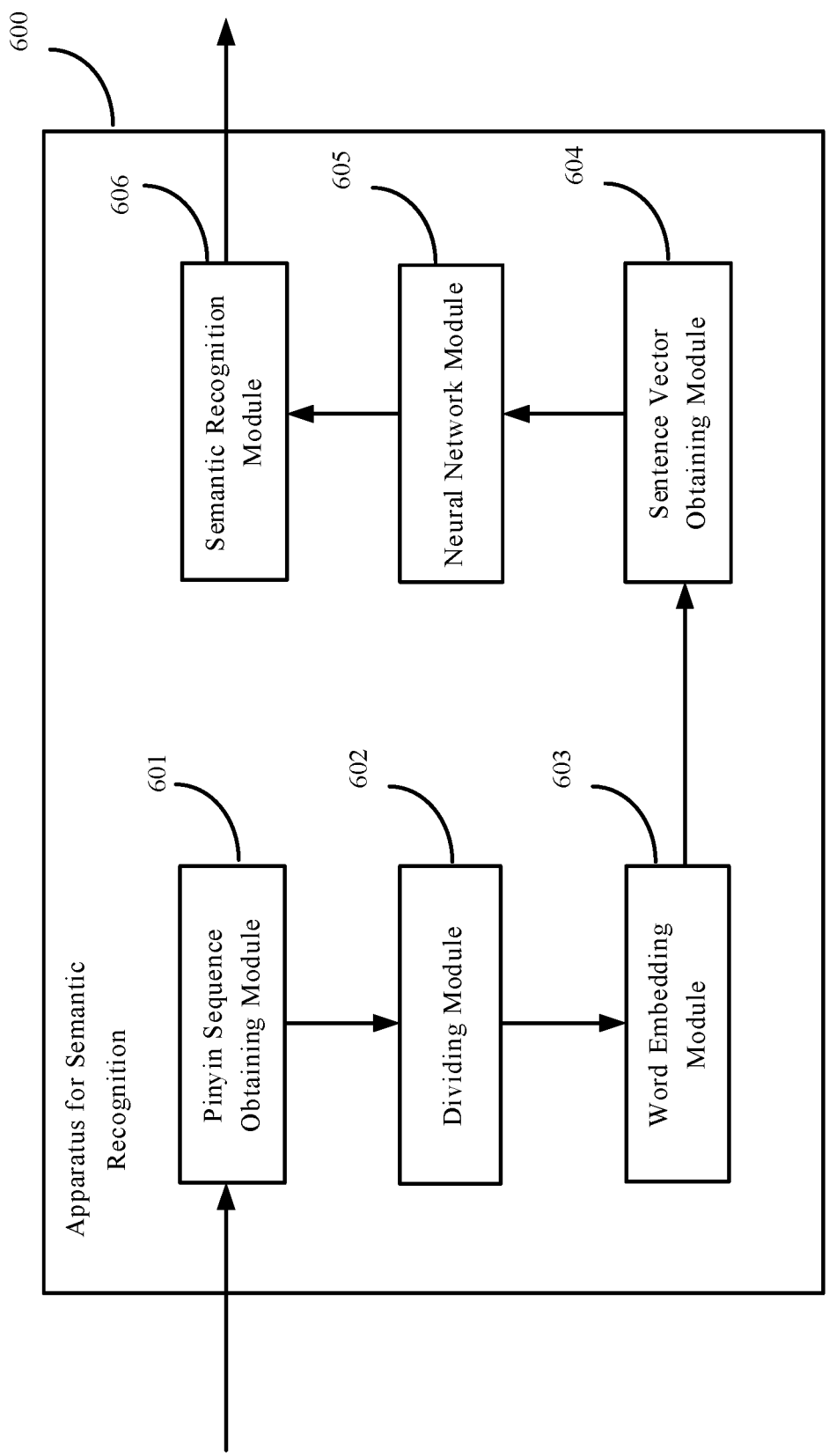
FIG. 6 illustrates a schematic structural block diagram of an apparatus for semantic recognition according to an embodiment of the present disclosure.

As shown in FIG. 6, the apparatus 600 for semantic recognition according to some embodiments of the present disclosure includes a Pinyin sequence obtaining module 601, a word embedding module 603, a sentence vector obtaining module 604, a neural network module 605, and a semantic recognition module 606.

The Pinyin sequence obtaining module 601 is configured to obtain a Pinyin sequence of the sentence to be recognized.

The word embedding module 603 is configured to obtain word vectors of the plurality of Pinyin segments.

The sentence vector obtaining module 604 is configured to combine the word vectors of the plurality of Pinyin segments into a sentence vector of the sentence to be recognized.

The neural network module 605 is configured to obtain, based on the sentence vector of the sentence to be recognized, an output vector of the sentence to be recognized by using a neural network.

The semantic recognition module 606 is configured to determine, based on the output vector of the sentence to be recognized, a reference sentence semantically similar to the sentence to be recognized, and recognize a semantic meaning of the sentence to be recognized as a semantic meaning of the reference sentence.

In some exemplary embodiments, the Pinyin segment is Pinyin of a word in the sentence to be recognized.

In some exemplary embodiments, the apparatus for semantic recognition further includes a dividing module 602 configured to divide the Pinyin in the Pinyin sequence corresponding to the word in the sentence to be recognized into an initial consonant and a vowel as the Pinyin segment in the Pinyin sequence.

In some exemplary embodiments, the semantic recognition module 606 is further configured to calculate a distance between the output vector of the sentence to be recognized and an output vector of a candidate reference sentence in a set of reference sentences, and determine the candidate reference sentence as the reference sentence semantically similar to the sentence to be recognized, in response to the distance being less than a threshold.

In some exemplary embodiments, the word embedding model is a Word2vec model.

In some exemplary embodiments, the word embedding module is further configured to be trained using first training data. The first training data include Pinyin sequences of a plurality of training sentences.

In some exemplary embodiments, the Pinyin sequence obtaining module 601 is further configured to obtain a Pinyin sequence of the words in each training sentence of at least one group of second training sentences. The training sentences of each group of second training sentences have similar semantic meanings.

The word embedding module 603 is further configured to obtain the word vectors of the Pinyin segments in the Pinyin sequence of each training sentence.

The sentence vector obtaining module 604 is further configured to combine the word vectors of the Pinyin segments in the Pinyin sequence of each training sentence into a sentence vector of each training sentence.

The neural network module 605 is further configured to train the neural network by using the sentence vectors of the training sentences, such that the output vectors of the training sentences from the neural network are the same.

In some exemplary embodiments, the Pinyin sequence obtaining module 601 is further configured to obtain the Pinyin sequence of the sentence to be recognized which is inputted by a user using a Pinyin input method.

Figure 7:
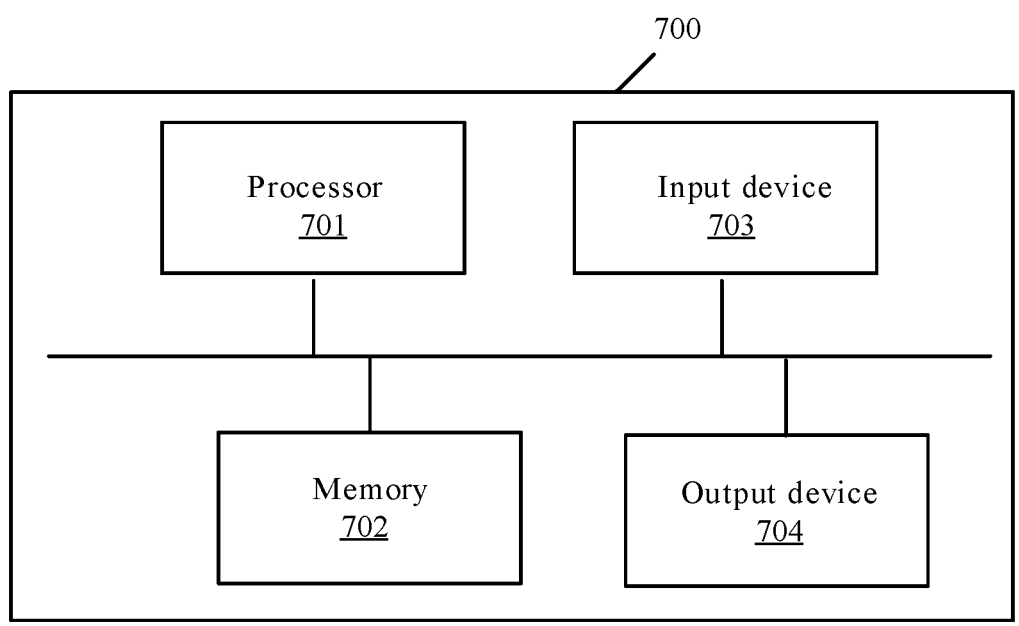
FIG. 7 illustrates a schematic structural block diagram of an apparatus for semantic recognition according to an embodiment of the present disclosure.

Another aspect of the present disclosure further provides an apparatus for semantic recognition. FIG. 7 illustrates a schematic structural block diagram of an apparatus 700 for semantic recognition according to an embodiment of the present disclosure.

As shown in FIG. 7, the apparatus 700 may include a processor 701 and a memory 702 storing a computer program. The computer program is executable by the processor 701, whereby the apparatus 700 is configured to perform the steps of the method for semantic recognition as shown in FIG. 3. That is, the apparatus 700 may obtain a Pinyin sequence of a sentence to be recognized. The Pinyin sequence includes a plurality of Pinyin segments. Next, the apparatus 700 may obtain word vectors of the plurality of Pinyin segments. Next, the apparatus 700 may combine the word vectors of the plurality of Pinyin segments into a sentence vector of the sentence to be recognized. Next, the apparatus 700 may obtain, based on the sentence vector of the sentence to be recognized, an output vector of the sentence to be recognized by using a neural network. Next, the apparatus 700 may determine, based on the output vector of the sentence to be recognized, a reference sentence semantically similar to the sentence to be recognized. The apparatus 700 may recognize a semantic meaning of the sentence to be recognized as a semantic meaning of the reference sentence.

In some embodiments of the present disclosure, the processor 701 may be, for example, a central processing unit (CPU), a microprocessor, a digital signal processor (DSP), a processor based on a multi-core processor architecture, and so on. The memory 702 may be a memory of any type that is implemented by using a data storage technology, including but not limited to a random access memory, a read-only memory, a semiconductor-based memory, a flash memory, a magnetic disk memory, and so on.

Furthermore, in some embodiments of the present disclosure, the apparatus 700 also may include an input device 703 such as a keyboard, a mouse, or a microphone to input the sentence to be recognized. Moreover, the apparatus 700 may also include an output device 704 such as a display to output a reply.

In some embodiments of the present disclosure, the apparatus 700 may determine, based on the output vector of the sentence to be recognized, the reference sentence semantically similar to the sentence to be recognized by calculating a distance between the output vector of the sentence to be recognized and an output vector of a candidate reference sentence in a set of reference sentences, and determining the candidate reference sentence as the reference sentence semantically similar to the sentence to be recognized, in response to the distance being less than a threshold.

In some embodiments of the present disclosure, the apparatus 700 may also train the word embedding model by using first training data. The first training data include Pinyin sequences of a plurality of training sentences.

In some embodiments of the present disclosure, the apparatus 700 may also obtain a Pinyin sequence of each training sentence of at least one group of training sentences, wherein the training sentences of each group of training sentences are semantically similar. For each group of training sentences, the apparatus 700 may also obtain word vectors of Pinyin segments in the Pinyin sequence of each training sentence, combine the word vectors of the Pinyin segments in the Pinyin sequence of each training sentence into a sentence vector of each training sentence, and train the neural network by using the sentence vectors of the training sentences, such that the output vectors of the training sentences from the neural network are the same.

In some embodiments of the present disclosure, the apparatus 700 may obtain the Pinyin sequence of the sentence to be recognized by obtaining the Pinyin sequence of the sentence to be recognized which is inputted by a user using a Pinyin input method.

In some embodiments of the present disclosure, the apparatus 700 may obtain the Pinyin sequence of the sentence to be recognized by obtaining speech information of the sentence to be recognized which is spoken by a user, performing a speech recognition on the speech information to obtain text information corresponding to the speech information, and converting the text information into the Pinyin sequence of the sentence to be recognized.

The apparatus for semantic recognition according to some embodiments of the present disclosure has been described above with reference to the accompanying drawings. However, it is to be noted that the above description is by way of example only and is not intended to be limit of the present disclosure. In other embodiments of the present disclosure, the apparatus may have more, less, or different modules, and the relationship such as connection, inclusion, and functionality etc. among the modules may be different from what has been described and illustrated. For example, a plurality of functions generally executed by one module also may be executed by a plurality of separate modules. A plurality of modules executing different functions may be combined into one module for executing these functions. Functions executed by one module also may be executed by another module. All these variations fall within the spirit and the scope of the present disclosure.

Still another aspect of the present disclosure further provides a system for human-machine dialog. The system for human-machine dialog may be, for example, the system 100 for human-machine dialog as shown in FIG. 1, or a part thereof or a variant thereof.

According to some embodiments of the present disclosure, the system for human-machine dialog may include an obtaining apparatus, the apparatus for semantic recognition 600 and 700 according to any embodiment of the present disclosure, and an output device.

The obtaining apparatus is configured to obtain a sentence to be recognized from a user.

The output device is configured to obtain, in response to determining a reference sentence semantically similar to the sentence to be recognized, a reply associated with the reference sentence, and output the reply to the user.

Still another aspect of the present disclosure also provides a computer-readable storage medium, storing computer-executable instructions. The computer-executable instructions are executable by a computer, whereby the computer is configured to perform the method for semantic recognition according to any embodiment of the present disclosure.

Still another aspect of the present disclosure also provides a computer system, which includes a processor and a memory coupled to the processor. The memory stores program instructions, and the processor is configured to perform the method for semantic recognition according to any embodiment of the present disclosure by loading and executing the program instructions in the memory. As is known to those skilled in the art, the computer system may also include other components, such as various input output components, communication components, and the like. Since these components may be components in the existing computer system, they are not described repeatedly here.

As can be seen, in some embodiments of the present disclosure, in the training phase, the text information is converted to Pinyin. In some embodiments, Pinyin of a word is further divided into two parts, an initial consonant and a vowel. Next, the word embedding is performed. After the text information is converted into a sentence vector, the sentence vector is trained by using the neural network. When a service is provided, the text information is converted into a Pinyin sequence, and then a sentence with the highest similarity is obtained as a matching result through a forward operation by the neural network. In this way, it can adapt to cases where there are more misspelled words, and interference caused by words having different meanings in the process of speech recognition or spelling can be eliminated. Moreover, the original network design may keep unchanged, just simple preprocessing being added. The technical solution provided by some embodiments of the present disclosure enhances the accuracy of semantic meaning understanding for the whole system, and this technical solution is a low-cost solution.

The method and the apparatus for semantic recognition and the system for human-machine dialog according to some embodiments of the present disclosure may be implemented by hardware, software, firmware, or any combination thereof. The method and the apparatus for semantic recognition and the system for human-machine dialog according to some embodiments of the present disclosure may be implemented in a computer system in a centralized manner, or in a distributed manner in which different components are distributed in a plurality of interconnected computer systems. A typical combination of hardware and software may be a general-purpose computer system with computer programs. A program code module in the computer programs corresponds to each module in the apparatus for semantic recognition according to some embodiments of the present disclosure. When the computer programs are loaded and executed, the computer system is controlled to execute operations and functions of each module in the apparatus for semantic recognition according to the embodiments of the present disclosure.

It is to be understood that the foregoing embodiments of the present disclosure are merely exemplary embodiments employed to describe the principles of the present disclosure. However, the present disclosure is not limited thereto. For those of ordinary skill in the art, various modifications and improvements may be made without departing from the spirit and essence of the present disclosure. These modifications and improvements are also deemed to be within the scope of protection of the present disclosure. The scope of protection of the present disclosure is limited only by the meaning expressed by the language of the appended claims and their equivalents.

What is claimed is:

1. A method for semantic recognition, the method comprising:
    obtaining a Pinyin sequence of a sentence to be recognized, the Pinyin sequence comprising a plurality of Pinyin segments, wherein obtaining the Pinyin sequence of the sentence to be recognized includes at least one of: i) obtaining the Pinyin sequence of the sentence to be recognized from a user input inputted by a user using a Pinyin input method, and ii) performing speech recognition on speech information spoken by the user to obtain text information corresponding to the speech information and converting the text information into the Pinyin sequence of the sentence to be recognized;
    obtaining word vectors of the plurality of Pinyin segments;
    combining the word vectors of the plurality of Pinyin segments into a sentence vector of the sentence to be recognized;
    obtaining, based on the sentence vector of the sentence to be recognized, an output vector of the sentence to be recognized by using a neural network;
    determining, based on the output vector of the sentence to be recognized, a reference sentence semantically similar to the sentence to be recognized; and
    recognizing a semantic meaning of the sentence to be recognized as a semantic meaning of the reference sentence.

2. The method according to claim 1, wherein the Pinyin segment is Pinyin of a word in the sentence to be recognized.

3. The method according to claim 1, wherein the Pinyin segment is a Pinyin alphabet of a word in the sentence to be recognized.

4. The method according to claim 1, wherein determining, based on the output vector of the sentence to be recognized, the reference sentence semantically similar to the sentence to be recognized comprises:
    calculating a distance between the output vector of the sentence to be recognized and an output vector of a candidate reference sentence in a set of reference sentences; and
    determining the candidate reference sentence as the reference sentence semantically similar to the sentence to be recognized, in response to the distance being less than a threshold.

5. The method according to claim 1, wherein the word vectors of the plurality of Pinyin segments are obtained by means of a word embedding model.

6. The method according to claim 5 further comprising:
    training the word embedding model by using first training data, wherein the first training data comprises Pinyin sequences of a plurality of training sentences.

7. The method according to claim 1 further comprising:
    obtaining a Pinyin sequence of each training sentence of at least one group of training sentences, wherein the training sentences of each group of training sentences are semantically similar; and
    for each group of training sentences:
        obtaining word vectors of Pinyin segments in the Pinyin sequence of each training sentence;
        combining the word vectors of the Pinyin segments in the Pinyin sequence of each training sentence into a sentence vector of each training sentence; and
        training the neural network by using the sentence vectors of the training sentences, such that the output vectors of the training sentences from the neural network are the same.

8. An apparatus for semantic recognition comprising:
    at least one processor; and
    at least one memory storing a computer program;
    wherein the computer program is executable by the at least one processor, the processor programmed to:
        obtain a Pinyin sequence of a sentence to be recognized, the Pinyin sequence comprising a plurality of Pinyin segments, wherein obtaining the Pinyin sequence of the sentence to be recognized includes at least one of: i) obtaining the Pinyin sequence of the sentence to be recognized from a user input inputted by a user using a Pinyin input method, and ii) performing speech recognition on speech information spoken by the user to obtain text information corresponding to the speech information and converting the text information into the Pinyin sequence of the sentence to be recognized;
        obtain word vectors of the plurality of Pinyin segments;
        combine the word vectors of the plurality of Pinyin segments into a sentence vector of the sentence to be recognized;
        obtain, based on the sentence vector of the sentence to be recognized, an output vector of the sentence to be recognized by using a neural network;
        determine, based on the output vector of the sentence to be recognized, a reference sentence semantically similar to the sentence to be recognized; and
        recognize a semantic meaning of the sentence to be recognized as a semantic meaning of the reference sentence.

9. The apparatus according to claim 8, wherein the Pinyin segment is Pinyin of a word in the sentence to be recognized.

10. The apparatus according to claim 8, wherein the Pinyin segment is a Pinyin alphabet of a word in the sentence to be recognized.

11. The apparatus according to claim 8, wherein the apparatus is configured to determine, based on the output vector of the sentence to be recognized, the reference sentence semantically similar to the sentence to be recognized by:
    calculating a distance between the output vector of the sentence to be recognized and an output vector of a candidate reference sentence in a set of reference sentences; and
    determining the candidate reference sentence as the reference sentence semantically similar to the sentence to be recognized, in response to the distance being less than a threshold.

12. The apparatus according to claim 8, wherein the word vectors of the plurality of Pinyin segments are obtained by means of a word embedding model.

13. The apparatus according to claim 12, wherein the apparatus is further configured to:
    train the word embedding model by using first training data, wherein the first training data comprise Pinyin sequences of a plurality of training sentences.

14. The apparatus according to claim 8, wherein the apparatus is further configured to:
    obtain a Pinyin sequence of each training sentence of at least one group of training sentences, wherein the training sentences of each group of training sentences are semantically similar; and
    for each group of training sentences:

obtain word vectors of Pinyin segments in the Pinyin sequence of each training sentence;

combine the word vectors of the Pinyin segments in the Pinyin sequence of each training sentence into a sentence vector of each training sentence; and train the neural network by using the sentence vectors of the training sentences, such that the output vectors of the training sentences from the neural network are the same.

15. A system for human-machine dialog comprising:

an obtaining apparatus, configured to obtain a sentence to be recognized from a user;

the apparatus for semantic recognition according to claim 8; and an output device, configured to obtain, in response to determining a reference sentence semantically similar to the sentence to be recognized, a reply associated with the reference sentence, and output the reply to the user.

16. A non-transitory tangible computer-readable storage medium, storing computer-executable instructions, wherein the computer-executable instructions are executable by a computer, and wherein the computer is configured to perform the method according to claim 1.

* * * * *